United States Patent [19]

Sigai et al.

[11] Patent Number: 4,937,503

[45] Date of Patent: Jun. 26, 1990

[54] FLUORESCENT LIGHT SOURCE BASED ON A PHOSPHOR EXCITED BY A MOLECULAR DISCHARGE

[75] Inventors: A. Gary Sigai, Lexington; Walter P. Lapatovich, Hudson; Michael N. Alexander, Lexington, all of Mass.

[73] Assignee: GTE Laboratories Incorporated, Waltham, Mass.

[21] Appl. No.: 179,808

[22] Filed: Apr. 11, 1988

[51] Int. Cl.[5] .................... H05B 41/16; H05B 41/24; H01J 1/62; H01J 63/04

[52] U.S. Cl. .................................. 315/248; 313/485; 313/486; 313/638

[58] Field of Search ............... 315/248; 313/485, 486, 313/638; 252/301.4 R

[56] References Cited

U.S. PATENT DOCUMENTS

| | | | |
|---|---|---|---|
| 3,453,427 | 7/1969 | Leiga et al. | 250/42 |
| 3,577,169 | 4/1971 | Barry | 313/486 |
| 4,266,167 | 5/1981 | Proud et al. | 315/248 |
| 4,427,921 | 1/1984 | Proud et al. | 315/248 |
| 4,427,923 | 1/1984 | Proud et al. | 315/248 |
| 4,427,924 | 1/1984 | Proud et al. | 315/248 |
| 4,480,213 | 10/1984 | Lapatovich et al. | 315/248 |
| 4,492,898 | 1/1985 | Lapatovich et al. | 315/248 |
| 4,636,692 | 1/1987 | Lapatovich et al. | 315/248 |
| 4,647,821 | 3/1987 | Lapatovich et al. | 315/248 |
| 4,710,679 | 12/1987 | Budinger et al. | 315/58 |

OTHER PUBLICATIONS

Keith A. Butler, Fluoreschent Lamp Phosphors Technology and Theory, Penn. State Univ. Press(1988), No. 43, p. 52.

Algird G. Leiga and John A. McInally, Enhancement of the 2062-Å Atomic-Iodine Line in an Iodine Inert-Gas Flashlamp, J. Optical Soc. Am., 57 (1967), pp. 317–318.

Primary Examiner—Eugene R. Laroche
Assistant Examiner—Michael Shingleton
Attorney, Agent, or Firm—Ivan L. Fricson; Frances P. Craig

[57] ABSTRACT

A fluorescent light source based on a phosphor excited by a molecular discharge is described. The fluorescent light source comprises a capacitively coupled compact fluorescent lamp coated with a manganese doped magnesium aluminate phosphor on the inside surface of the lamp envelope. The compact fluorescent lamp produces a plasma which emits 206 nm radiation from the molecular discharge of the iodine containing molecular vapors and inert gas fill which in turn excites the phosphor to emit visible light.

6 Claims, 2 Drawing Sheets

FLUORESCENT LIGHT SOURCE BASED ON A PHOSPHOR EXCITED BY A MOLECULAR DISCHARGE

CROSS REFERENCE TO RELATED APPLICATION

A co-pending patent application Ser. No. 07/179,815, filed concurrently herewith, entitled "FLUORESCENT LAMP BASED ON A PHOSPHOR EXCITED BY A MOLECULAR DISCHARGE", and assigned to GTE Laboratories Incorporated assignee of the present application, concerns related subject matter of this application.

1. Field of the Invention

This invention relates to a fluorescent light source. More particularly, this invention relates to a fluorescent light source based on a phosphor excited by a molecular discharge.

2. Background of the Invention

Low pressure electric discharges have been utilized for years to produce visible and ultraviolet emission. In most cases the plasmas have contained excited or ionized atomic species. The mercury-inert gas discharge, which emits primarily 254 nm radiation, is the classic example. The addition of molecules to discharges to enrich the visible spectrum is a well-studied art, as evidenced by metal halide lamps.

Because of the limitations of the emission spectra of mercury-inert gas discharge lamps and metal halide lamps, many efficient phosphors have limited applications because the peaks of their excitation spectra poorly match the output of the low pressure mercury discharge.

Therefore, the development of alternative intense ultraviolet sources offers new opportunities for use of both new and established phosphors in lamps.

SUMMARY OF THE INVENTION

In accordance with one aspect of the present invention, a new and improved fluorescent light source comprises a compact fluorescent lamp which has a lamp envelope made of a light transmitting substance. The envelope includes an outer surface, an inner surface with a manganese doped magnesium aluminate phosphor coating thereon which emits visible light upon absorption of ultraviolet radiation of about 206 nm, and at least one re-entrant cavity. The envelope also encloses a fill material which forms a plasma during discharge. The plasma emits ultraviolet radiation of about 206 nm during discharge and has an effective electrical impedance. The compact fluorescent lamp has an outer conductor disposed around the outer surface of the envelope. The compact fluorescent lamp has an inner conductor disposed in the re-entrant cavity and a high frequency power source coupled to the inner and outer conductors for inducing an electric field in the compact fluorescent lamp causing a discharge therein.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

A new and improved fluorescent light source has been developed which utilizes a well-known but little utilized phosphor, $MgAl_2O_4$:Mn, a Mn-doped spinel, excited by a molecular discharge provided by the fluorescent light source. The green fluorescence of this phosphor peaks near 520 nm with a full width at half the maximum peak height of 35 nm. As can be seen from the excitation spectrum of FIG. 1, this phosphor cannot be excited effectively by 254 nm radiation.

Figure 1:
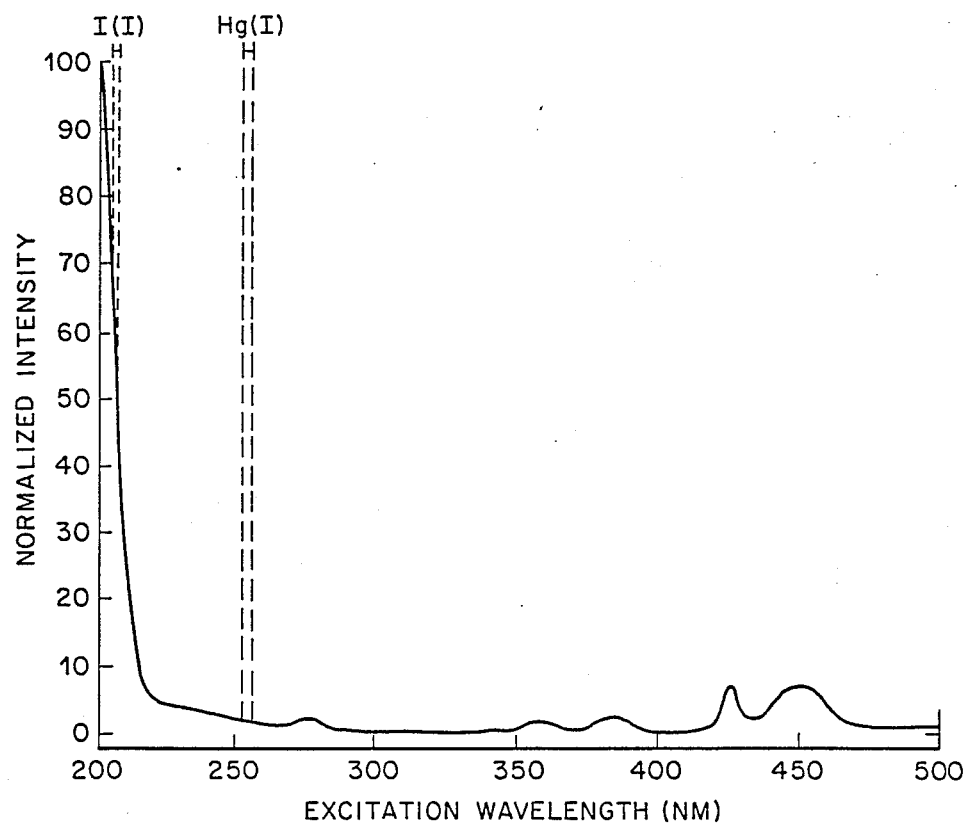
FIG. 1 illustrates an excitation spectrum of $(Mg_{0.995}Mn_{0.005})Al_2O_4$ for emission at 520 nm.

However, the $MgAl_2O_4$ emission is strongly excited by radiation having a wavelength near 200 nm, apparently because of host absorption with energy transfer to the $Mn^{2+}$. This strong absorption can be excited by iodine-containing discharges, as shown in FIG. 1, which schematically superimposes the emission of an iodine containing discharge on the $(Mg_{0.995}Mn_{0.005})Al_2O_4$ excitation spectrum. The intense 206 nm line of neutral atomic iodine $I(I):6s^2p_{3/2} - 5^2p°_{\frac{1}{2}}$ nicely matches the $MgAl_2O_4$:Mn absorption. The weak excitation bands are due to $Mn^{2+}$ transitions from its ground state to its 3d levels. The strong band near 200 nm has been attributed to host absorption followed by energy transfer to $Mn^{2+}$. The dotted lines, depicted in FIG. 1, correspond to emission from an iodine source compared to that of a standard mercury discharge, respectively.

Molecular discharges emitting strongly at about 206 nm are easily produced in $I_2$ vapor, $HgI_2$, or other iodine containing molecular vapors. Through dissociation, the molecules act as donors of neutral atomic iodine which are intense UV radiators. Mn-doped spinel irradiated by an RF excited $I_2$ discharge has exhibited efficient green $Mn^{2+}$ emission.

Figure 2:
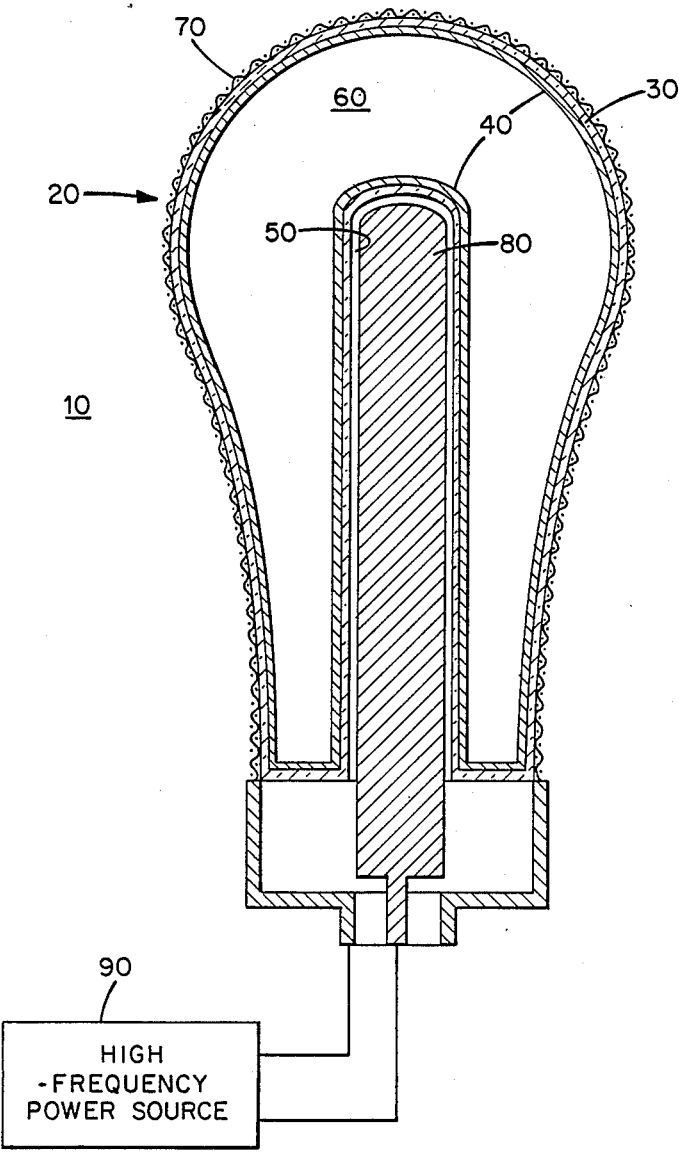
FIG. 2 illustrates a capacitively coupled compact fluorescent light source in accordance with the present invention.

Depicted in FIG. 2, fluorescent light source 10 comprises compact fluorescent lamp 20 having lamp envelope 30 made of a light transmitting substance such as glass. Envelope 30 includes an outer surface, an inner surface with manganese doped magnesium aluminate phosphor coating 40 thereon which emits visible light upon absorption of ultraviolet radiation of about 206 nm, and at least one re-entrant cavity 50. Envelope 30 also encloses fill material 60 which forms a plasma during discharge. The plasma emits ultraviolet radiation of about 206 nm during discharge and has an effective electrical impedance. Compact fluorescent lamp 20 has outer conductor 70 disposed around the outer surface of envelope 30. Compact fluorescent lamp 20 has inner conductor 80 disposed in re-entrant cavity 50 and high frequency power source 90 coupled to inner and outer conductors, 80 and 70 respectively, for inducing an electric field in compact fluorescent lamp 20 causing a discharge therein.

SPECIFIC EXAMPLE

The Mn-Doped Spinel Phosphor Synthesis

The preparation of the manganese-activated magnesium aluminate spinel $(Mg_{0.99}Mn_{0.01}Al_2O_4)$ used within the compact fluorescent lamps employed the following starting materials: reagent grade $Al(OH)_3$ obtained from Baker Chemical Co., MgO obtained from Morton Thiokol Inc., and $MnCO_3$ (assay 46.32% Mn, theoretical 47.8%) obtained from the Chemical and Metallurgical Division of GTE Products Corporation.

The raw materials were thoroughly blended and fired in an alumina crucible in a furnace programmed to ramp from 700° C. to 1600° C. within ½ hour, hold at 1600° C. for 4 hours, and ramp down to 700° C. within ½ hour. All heating occurred in dry forming gas (5% $H_2$ in $N_2$). An alumina crucible containing MgO was placed upstream of the phosphor-containing crucible. Its purpose was to provide a saturated vapor pressure of MgO for the phosphor-containing crucible. Comparison between the experimentally observed weight loss (27.76%) and the theoretically predicted weight loss (27.63%) of the phosphor-containing crucible, based on conversion of the carbonate and hydroxide to their respective oxides, showed that no significant compositional change occurred.

After firing, the phosphor was crushed and sieved through a 325 mesh screen. The resulting screened phosphor had a white body color and was not excited by short- or long-wavelength mercury lamp excitation (hand lamp). X-ray analysis confirmed the presence of only the spinel structure.

An example of the phosphor batch weights is as follows:

| | |
|---|---|
| Al(OH)$_3$ | 62.33 gms. |
| MgO | 16.200 gms. |
| MnCO$_3$ | 0.488 gms. (actual, which took into account corrections for Mn assay) |
| Total | 79.01 gms. |

The weight of the resulting phosphor was 57.08 gms.

For this particular application the Mn concentration can be from about 0.5 to about 5 mole % Mn so that the formula would be $(Mg_{x-1}Mn_x)Al_2O_4$ wherein $0.005 \leq x \leq 0.05$. In the example, the amount of MnCO$_3$ corresponds to 1 mole % Mn.

Preparation of the Phosphor Suspension and the Coating of the Suspension in the Lamps 50 grams of the phosphor were made into a suspension using known techniques of wet sieving in a xylol-based nitrocellulose organic suspension system.

The suspension was then siphoned into a glass bulb, lamp envelope, by pulling a slight vacuum on one of the tubulation leads. The phosphor layer was applied by roll-coating the lamp envelope by hand. The remaining suspension was allowed to drain out of the lamp envelope. A slight flow of air was run through the lamp envelope to help remove residual solvents to complete drying of the unbaked phosphor coating.

Lamp Fabrication and Performance

Three lamp envelope blanks comprising a volume of about 297 cc each (approximately the size of a 100 W incandescent bulb) were coated with phosphors as described above. The coated lamp envelopes were baked at about 500° to about 600° C. with a continuous air flow through the envelopes to drive off the organic binder. As the binder was baked the binder took on a slight brownish color. After a total bakeout time of about one hour, the original white appearance of the envelope returned, a sign that the binder was fully expelled.

One tubulation of the lamp envelope was permanently sealed with a torch after the bake out. The second tubulation was inserted into a vacuum valve and then coupled to a vacuum backfill station where the lamp envelope atmosphere was exhausted. The valve was closed, decoupled from the vacuum system, and the valve with the lamp envelope attached was introduced into a dry box through an air lock chamber. The lamp envelope was removed from the valve inside the dry box and filled as discussed below. The lamp envelope was reattached to the valve and removed from the dry box through the air lock. The valve and lamp envelope were recoupled to the vacuum backfill station where the dry box atmosphere was exhausted, leaving only the ultra dry chemicals in the lamp envelope. The fill gas atmosphere (neon in this case) was introduced into the lamp envelope while attached to the backfill station. The fill gas was introduced using a pump and flush technique: fresh fill gas was introduced at about 100 torr, this gas was then pumped out, and the process was repeated. The pump and flush process was repeated three times. The final fill of neon was adjusted to the correct pressure, and the lamp envelope tubulation sealed permanently with a torch.

Three lamps were prepared:

| Lamp No. | Fill | Phosphor |
|---|---|---|
| 1 | 2 mg $I_2$ + 2 torr Ne | Mn spinel |
| 2 | 38 mg $HgI_2$ + 2 torr Ne | Mn spinel |
| 3 | 10 mg Hg + 2 torr Ne | Cool white |

The fills here are the preferred values, but can lie in a broader range. For example, the $I_2$ fill can be in the range $3 \times 10^{-3}$ mg/cm$^3$ to 0.5 mg/cm$^3$ with the preferred value of $6.73 \times 10^{-2}$ mg/cm$^3$; $HgI_2$ can be in the range $5.12 \times 10^{-3}$ mg/cm$^3$ to 0.26 mg/cm$^3$ with the preferred value of 0.13 mg/cm$^3$; the fill gas can be another of the inert gases such as argon, krypton, or xenon, in the pressure range of 0.01 to 20 torr with the preferred value of 2 torr. Lamp fill number three is for control comparison.

The compact fluorescent lamps were energized by capacitively coupling RF energy at 915 MHz between the center antenna, the inner conductor inside the reentrant cavity, and the ground plane defined by the exterior copper mesh, the outer conductor. A number of devices may be used to produce the high frequency RF power; a magnetron generator was used.

The discharge frequently self starts due to the presence of background cosmic ray radiation. Starting can be assisted by rapidly varying the load impedance through the use of an adjustable tuning stub placed in the coaxial waveguide. When all else fails, starting is accomplished with the aid of a spark coil.

Once the discharge is initiated, the RF field drives the electrons. Energy is coupled into the bulk fill gas through inelastic collisions between the electrons and neutral atoms and molecules. These collisions produce dissociation products and impart energy to the atoms, molecules, and fragments. This energy ultimately reemerges as heat or light.

Lamp 3 was used to test the RF line. Lamp 1 ran successfully and produced 66 lm with 16 W of coupled power for an efficacy of 4.1 lm/W. Lamp 2 also ran successfully and produced 92 lm at 20 W of coupled power for an efficacy of 4.6 lm/W. The lamp envelope temperature in these experiments was measured at about 80° C. The lamp envelope was not heated externally.

Other sources of UV were tested but found unsuitable for excitation of the manganese activated spinel. Discharges were produced in gallium and phosphorous trihalides. However, these sources exhibited spectral emissions which did not match well with the manganese activated spinel absorption spectrum.

However, with an $HgI_2$ discharge the spectral emission matched well with the manganese activated magnesium aluminate absorption spectrum resulting in a fluorescent light source based on a manganese activated spinel phosphor.

While there has been shown and described what is at present considered the preferred embodiment of the invention, it will be obvious to those skilled in the art that various changes and modifications may be made therein without departing from the scope of the invention as defined by the appended claims.

What is claimed is:

1. A fluorescent light source comprising
   a compact fluorescent lamp having a lamp envelope made of a light transmitting substance, said envelope including an outer surface, an inner surface with a manganese doped magnesium aluminate phosphor coating thereon which emits visible light upon absorption of ultraviolet radiation of about 206 nm and at least one re-entrant cavity and enclosing a fill material which forms a plasma during discharge, said plasma emits ultraviolet radiation of about 206 nm and has an effective electrical impedance;
   an outer conductor disposed around the outer surface of said envelope;
   an inner conductor disposed in said re-entrant cavity; and
   a high frequency power source coupled to said inner and outer conductors for inducing an electric field in said compact fluorescent lamp and causing discharge therein.

2. A fluorescent light source in accordance with claim 1 wherein said manganese doped magnesium aluminate phosphor has an approximate formula $$MgAl_2O_4{:}Mn$$

3. A fluorescent light source in accordance with claim 2 wherein said approximate formula is $$(Mg_{1-x}Mn_x)Al_2O_4$$

wherein $$0.005 \leq x \leq 0.05$$

4. A fluorescent light source in accordance with claim 1 wherein said light transmitting substance comprises glass.

5. A fluorescent light source in accordance with claim 1 wherein said fill material comprises an iodine containing molecular vapor and an inert gas selected from the group consisting of neon, argon, krypton, xenon, or mixtures thereof.

6. A fluorescent light source in accordance with claim 5 wherein said iodine containing molecular vapor is selected from the group consisting of molecular vapors of $I_2$, $HgI_2$, and mixtures thereof.

* * * * *